(12) United States Patent
Bang (10) Patent No.: US 7,528,857 B2
(45) Date of Patent: May 5, 2009

(54) APPARATUS FOR SUPPORTING OPTICAL COMPONENT, AND LASER SCANNER AND IMAGE FORMING DEVICE HAVING THE SAME

(75) Inventor: Doo-jin Bang, Yongin-si (KR)

(73) Assignee: Samsung Electronics, Inc., Suwon-si, Gyeonggi-do (KR)

( * ) Notice: Subject to any disclaimer, the term of this patent is extended or adjusted under 35 U.S.C. 154(b) by 90 days.

(21) Appl. No.: 11/650,488

(22) Filed: Jan. 8, 2007

(65) Prior Publication Data

US 2008/0002019 A1    Jan. 3, 2008

(30) Foreign Application Priority Data

Jun. 30, 2006    (KR) .................... 10-2006-0060812

(51) Int. Cl.
*G02B 7/00*    (2006.01)
*B41J 2/435*    (2006.01)

(52) U.S. Cl. ...................................... 347/242; 347/257

(58) Field of Classification Search ................ 347/241, 347/242, 245, 256, 257, 263; 359/819, 822
See application file for complete search history.

(56) References Cited

U.S. PATENT DOCUMENTS

| 6,594,204 | B1 * | 7/2003 | Yamamoto et al. | ........ 369/44.14 |
| 7,301,713 | B2 * | 11/2007 | Yamamoto et al. | .......... 359/820 |
| 2005/0105198 | A1 | 5/2005 | Shim | |
| 2006/0132881 | A1 | 6/2006 | Kim | |

FOREIGN PATENT DOCUMENTS

DE    100 15 953    10/2000

* cited by examiner

*Primary Examiner*—Huan H Tran
(74) *Attorney, Agent, or Firm*—Roylance, Abrams, Berdo & Goodman, L.L.P.

(57) ABSTRACT

An apparatus for supporting an optical component that stably and precisely mounts the optical component for reflecting or permeating a beam emitted from a light source on a frame, and a laser scanner and an image forming device having the same, respectively. The laser scanner includes a light source, a reflective mirror to reflect a beam emitted from the light source, a supporting surface to support the reflective mirror in a predetermined orientation, and at least one horizontal reference surface and at least one vertical reference surface disposed in the supporting surface to provide reference surfaces for measuring a reflective point of the reflective mirror.

34 Claims, 8 Drawing Sheets

APPARATUS FOR SUPPORTING OPTICAL COMPONENT, AND LASER SCANNER AND IMAGE FORMING DEVICE HAVING THE SAME

CROSS-REFERENCE TO RELATED APPLICATIONS

This application claims the benefit under 35 U.S.C. § 119(a) from Korean Patent Application No. 10-2006-60812, filed on Jun. 30, 2006, in the Korean Intellectual Property Office, the entire content of which is hereby incorporated by reference.

BACKGROUND OF THE INVENTION

1. Field of the Invention

The present invention relates to a laser scanner. More particularly, the present invention relates to an optical component supporting apparatus that more precisely and stably mounts an optical component for reflecting or permeating a beam emitted from a light source, and a laser scanner and an image forming device having the same, respectively.

2. Description of the Related Art

Generally, an image forming device, such as a laser printer, a copier, a scanner, and a multi-function machine, includes a laser scanner. The laser scanner defectively scans a beam emitted from a light source in a predetermined direction by a polygonal mirror, which is rotated at a high speed, and images the scanned beam onto a photoconductor via an optical system.

Figure 1:
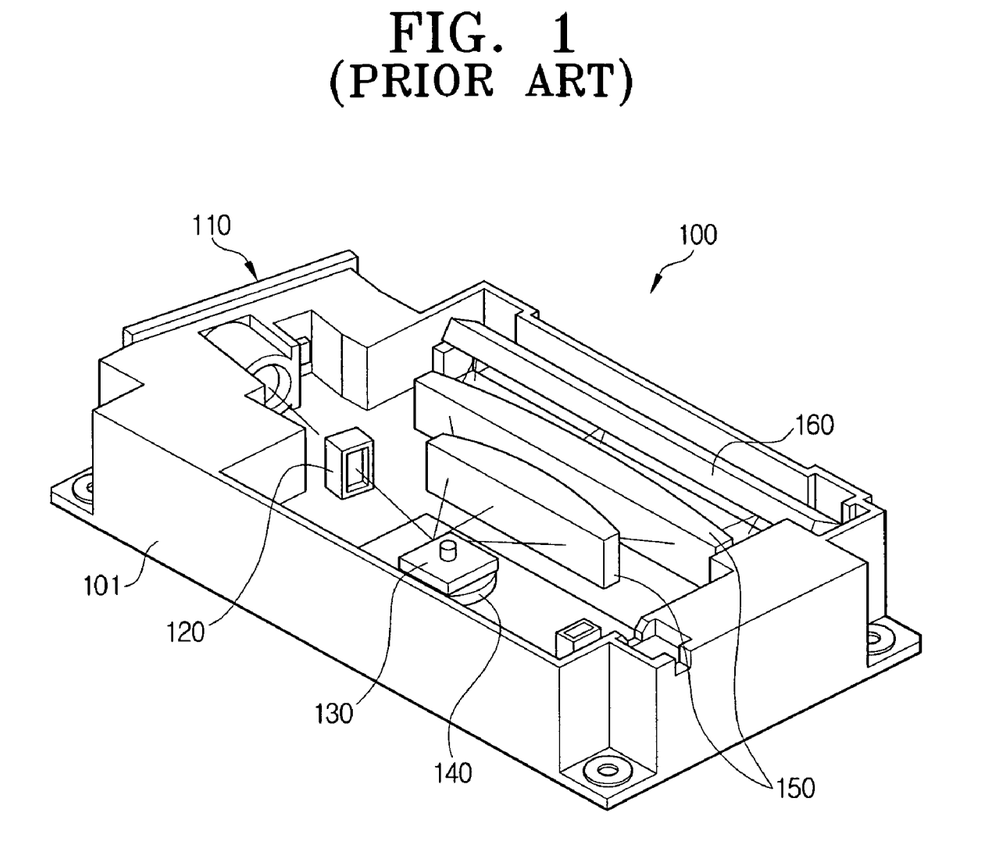
FIG. 1 is a perspective view exemplifying a general laser scanner.

FIG. 1 is a perspective view schematically exemplifying an example of the laser scanner. As shown in FIG. 1, the laser scanner 100 includes a light source unit 110, a cylindrical lens 120, a polygonal mirror 130, a driving motor 140 to drive the polygonal mirror, an imaging lens 150, a reflective mirror 160, and an optical frame 101 to support the optical components 110, 120, 130, 150, and 160.

A beam emitted from the light source unit 110 is concentrated on reflective surfaces of the polygonal mirror 130 through the cylindrical lens 120, defectively reflected in a uniform velocity through the polygonal mirror 130, and then imaged on a photoconductive medium (not shown) via the imaging lens 150 and the reflective mirror 160.

To precisely reflect or permeate the beam, it requires that among the optical components described above, optical components, such as the reflective mirror 160 or the lenses 150 and 120, which are installed at predetermined angles to reflect or permeate the beam, should be assembled and fixed in a precise angle and with a precise orientation.

Figure 2:
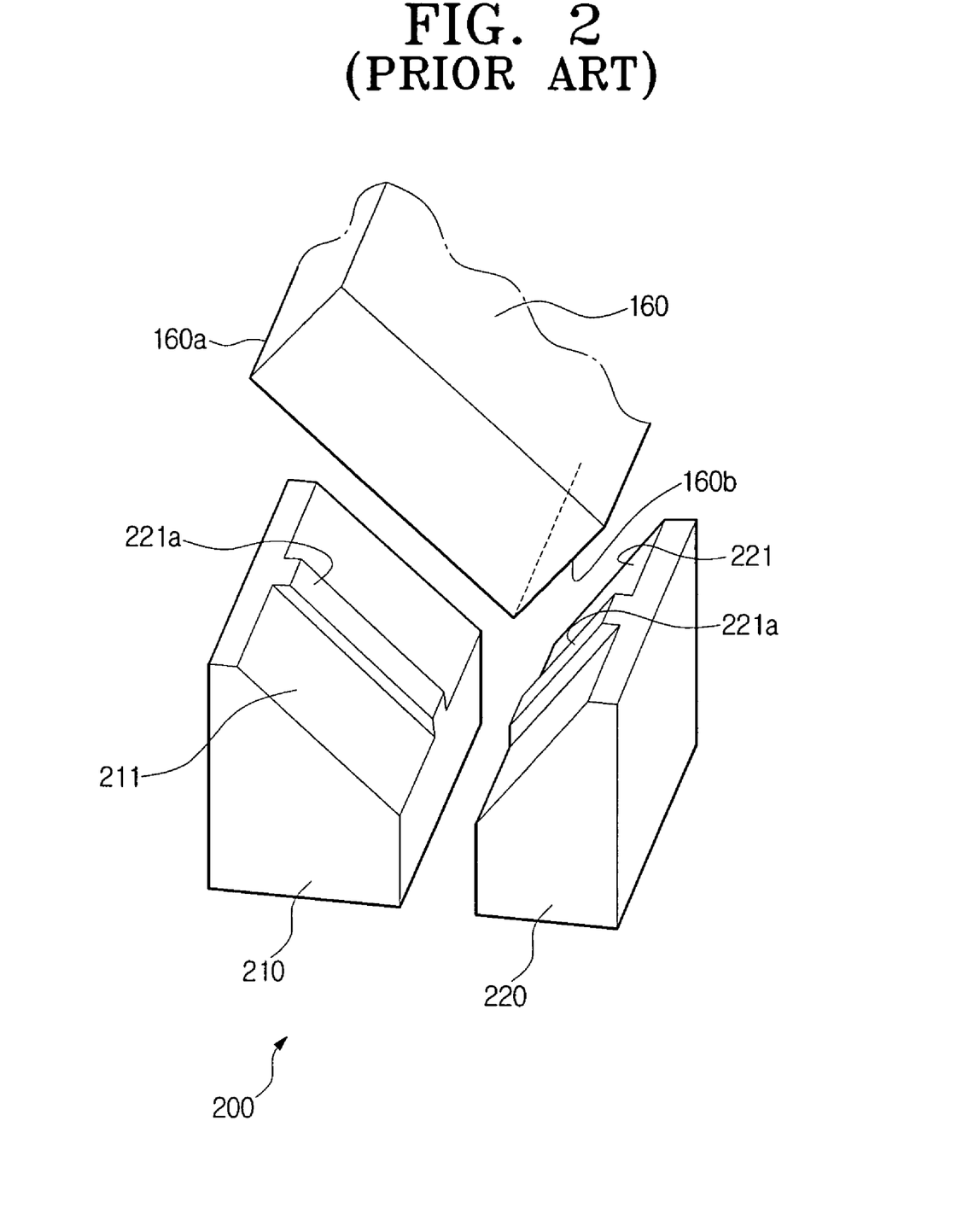
FIG. 2 is a perspective view exemplifying a conventional optical component supporting apparatus.

FIG. 2 is a perspective view exemplifying the reflective mirror 160 installed in the optical frame 101.

As shown in FIG. 2, the reflective mirror 160 is secured at surfaces 160a and 160b thereof and mounted on a supporting apparatus 200, which is provided in the optical frame 101.

The supporting apparatus 200 includes a first supporting unit 210 to support a reflective surface 160a of the reflective mirror 160, and a second supporting unit 220 to support a lower surface 160b of the reflective mirror 160.

The first and the second supporting units 210 and 220 are provided with first and second supporting surfaces 211 and 221 to support the reflective surface 160a and the lower surface 160b of the reflective mirror 160, respectively.

Also, the first and the second supporting surfaces 211 and 221 are configured, so that supporting projections 211a and 221a are extended in longitudinal directions of the supporting surfaces 211 and 221, respectively, thereby precisely supporting the reflective surface 160a and the lower surface 160b of the reflective mirror 160.

Particularly in the supporting projections 211a and 221a, dimensions, such as an inclined angle, a vertical length and a horizontal length, should be very precisely formed. When the dimensions of the supporting projections 211a and 221a are not precisely formed, the installed orientation or angle of the reflective mirror 160 may be deviated from the design tolerance, thereby deteriorating the reliability of products.

Accordingly, the conventional supporting apparatus as shown in FIG. 2 requires a high-priced measuring device for measuring inclined angles of the supporting projections 211a and 221a and/or the supporting surfaces 211 and 221, so that such measuring work is difficult and troublesome. Also, the conventional supporting apparatus cannot accurately confirm a position to or through which the beam transmitted from the light source is reflected or permeated. As a result, when the reflected or permeated position is not specified, the laser scanner cannot show a desired performance.

Accordingly, a need exists for an improved support apparatus for accurately positioning and orienting an optical component.

SUMMARY OF THE INVENTION

Exemplary embodiments of the present invention address at least the above problems and/or disadvantages and provide at least the advantages described below. Accordingly, an aspect of certain exemplary embodiments of the present invention is to provide an apparatus for supporting an optical component, which can install the optical component for reflecting or permeating a beam emitted from a light source in a more accurate position and with a more accurate orientation.

Another aspect of certain exemplary embodiments of the present invention is to provide an apparatus for supporting an optical component, which facilitates a dimension measurement of supporting units on which an optical component may be stably supported and installed.

Another aspect of certain exemplary embodiments of the present invention is to provide a laser scanner and an image forming device including an apparatus for supporting an optical component having characteristics as described above, respectively.

According to one aspect of an exemplary embodiment of the present invention, an apparatus for supporting an optical component includes a supporting surface to support the optical component in a certain orientation, and at least one horizontal reference surface and at least one vertical reference surface disposed in the supporting surface.

An edge part, a chamfered part, or a rounded part may be disposed at a place in which the horizontal reference surface and the vertical reference surface intersect.

The optical component may be a reflective mirror, and the horizontal reference surface and the vertical reference surface may be reference surfaces for measuring a reflective point of the reflective mirror.

According to one aspect of another exemplary embodiment of the present invention, an apparatus for supporting an optical component includes a body, a supporting surface disposed in the body and inclined at an angle to the body, and a first horizontal reference surface and a first vertical reference surface disposed in the supporting surface.

The body may further include a second horizontal reference surface and a second vertical reference surface for measuring an inclined angle of the supporting surface. An edge part may be disposed at a place in which the first horizontal reference surface and the first vertical reference surface intersect.

According to one aspect of another exemplary embodiment of the present invention, an apparatus for supporting an optical component includes a first supporting unit to support a first surface of the optical component, and a second supporting unit to support a second surface of the optical component. At least one of the first and the second supporting units includes a body, a supporting surface inclined at an angle in the body, and a first horizontal reference surface and a first vertical reference surface disposed in the supporting surface.

The body may further include a second horizontal reference surface and a second vertical reference surface for measuring an inclined angle of the supporting surface. An edge part may be disposed at a place in which the first horizontal reference surface and the first vertical reference surface intersect.

According to another aspect of an exemplary embodiments of the present invention, a laser scanner includes a light source, an optical component to reflect or permeate a beam emitted from the light source, and a supporting unit to stably support the optical component. The supporting unit includes a body, a supporting surface disposed in the body and inclined at an angle to the body, and a first horizontal reference surface and a first vertical reference surface disposed in the supporting surface.

The body may further include a second horizontal reference surface and a second vertical reference surface for measuring an inclined angle of the supporting surface. An edge part may be disposed at a place in which the first horizontal reference surface and the first vertical reference surface intersect.

According to another aspect of exemplary embodiments of the present invention, an image forming device includes a laser scanner to defectively scan a beam for forming a latent image on a photoconductive medium. The laser scanner includes a light source, an optical component to reflect or permeate the beam emitted from the light source, a supporting surface to support the optical component in a certain orientation, and at least one horizontal reference surface and at least one vertical reference surface disposed in the supporting surface.

Other objects, advantages and salient features of the invention will become apparent from the following detailed description, which, taken in conjunction with the annexed drawings, discloses exemplary embodiments of the invention.

BRIEF DESCRIPTION OF THE DRAWINGS

These and/or other aspects and advantages of certain exemplary embodiments of the present invention will become apparent and more readily appreciated from the following description of the exemplary embodiments, taken in conjunction with the accompanying drawings of which.

Throughout the drawings, like reference numerals will be understood to refer to like parts, components and structures.

DETAILED DESCRIPTION OF EXEMPLARY EMBODIMENTS

Reference will now be made in detail to the exemplary embodiments of the present invention, examples of which are illustrated in the accompanying drawings. The exemplary embodiments are described below in order to explain certain aspects of the present invention by referring to the figures.

Figure 3:
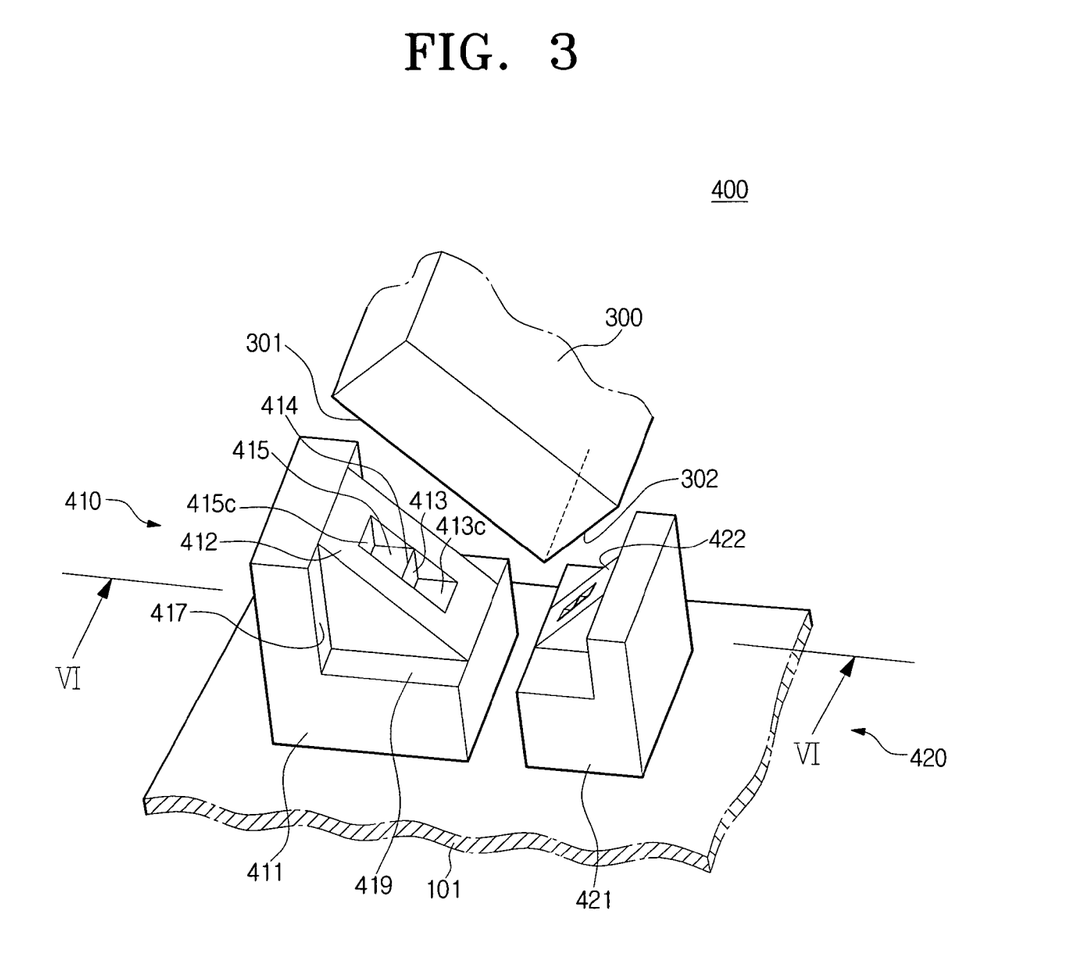
FIG. 3 is a perspective view exemplifying an optical component supporting apparatus in accordance with a first exemplary embodiment of the present invention.

FIG. 3 shows an optical component supporting apparatus in accordance with a first exemplary embodiment of the present invention.

As shown in FIG. 3, the optical component supporting apparatus 400 in accordance with the first exemplary embodiment of the present invention includes a main supporting unit 410 that stably supports an optical component 300.

The optical component 300 referred to in the first exemplary embodiment of the present invention may be one of various components, such as a reflective mirror 160, an imaging lens 150, a cylindrical lens 120 and the like, which reflect or permeate a light beam emitted from a light source unit 110, as illustrated in FIG. 1. The optical component 300 is made up of a polyhedron having a plurality of surfaces 301 and 302, which are supported by the optical component supporting apparatus 400 in accordance with the first exemplary embodiment of the present invention.

The main supporting unit 410 includes a body 411, a supporting surface 412 inclinedly provided in the body 411, and more than one first vertical reference surface 413 and more than one first horizontal reference surface 415 provided in the supporting surface 412.

The body 411 may be formed integrally with or detachably from an optical frame 101 (see FIG. 1).

The supporting surface 412 disposed in the body 411 may be formed at various angles according to installing orientations of the optical component 300, as shown in FIGS. 3 through 8, so that it stably supports the optical component 300.

As shown in FIGS. 3 through 8, the supporting surface 412 supports a first surface 301 of the optical component 300.

The first vertical reference surface 413 and the first horizontal reference surface 415 are formed in a vertical direction and a horizontal direction to the supporting surface 412, respectively. An edge part 414 is formed at a place in which the first vertical reference surface 413 and the first horizontal reference surface 415 intersect.

The edge part 414 may be set as a reference point to or through which the beam emitted from the light source unit 110 is reflected or permeated.

A subsidiary horizontal surface 413c is disposed on a lower end of the first vertical reference surface 413, and a subsidiary vertical surface 415c is disposed on an upper or left end of the first horizontal reference surface 415.

The optical component supporting apparatus 400 of the first exemplary embodiment of the present invention constructed as above is advantageous in that it may accurately confirm the reference point to or through which the beam is reflected or permeated through a simple measurement by the first vertical reference surface 413 and the first horizontal reference surface 415, and may more easily measure an inclined angle of the supporting surface 412 and various dimensions of the body 411 and the like.

In the first exemplary embodiment of the present invention, the first vertical reference surface 413 and the first horizontal reference surface 415 are formed at a center in a width direction of the supporting surface 412, as shown in FIG. 3.

The body 411 has a second vertical reference surface 417 and a second horizontal reference surface 419. The second vertical reference surface 417 in an upper end thereof intersects an upper end of the supporting surface 412. The second horizontal reference surface 419 in a right end thereof intersects a lower end of the supporting surface 412.

With the second vertical reference surface 417 and the second horizontal reference surface 419, the various dimensions, such as the inclined angle of the supporting surface 412, may be more easily measured.

Figure 4:
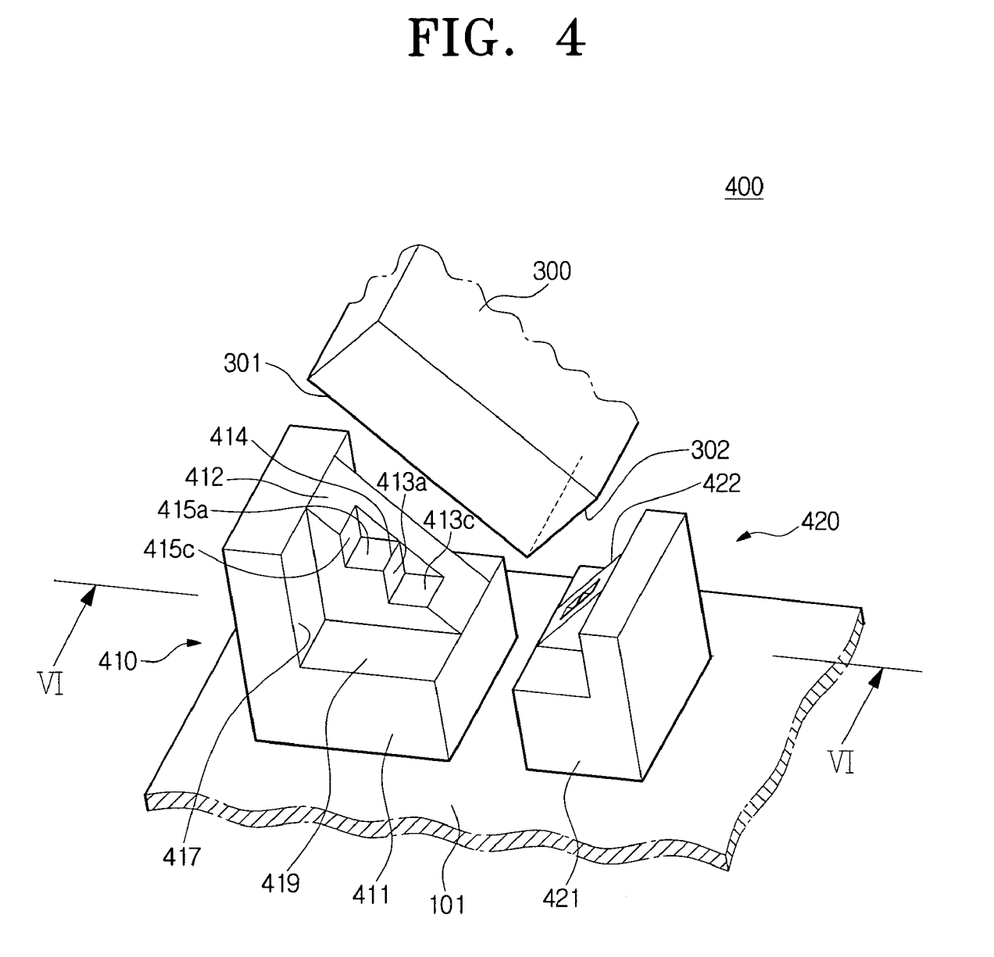
FIG. 4 is a perspective view exemplifying an optical component supporting apparatus in accordance with a second exemplary embodiment of the present invention.

FIG. 4 is a perspective view exemplifying an optical component supporting apparatus in accordance with a second exemplary embodiment of the present invention. As shown in FIG. 4, the optical component supporting apparatus of the second exemplary embodiment is substantially similar to the optical component supporting apparatus of the first exemplary embodiment shown in FIG. 3, except that a first vertical reference surface 413a and a first horizontal reference surface 415a are formed at a side end of a supporting surface 412.

Figure 5:
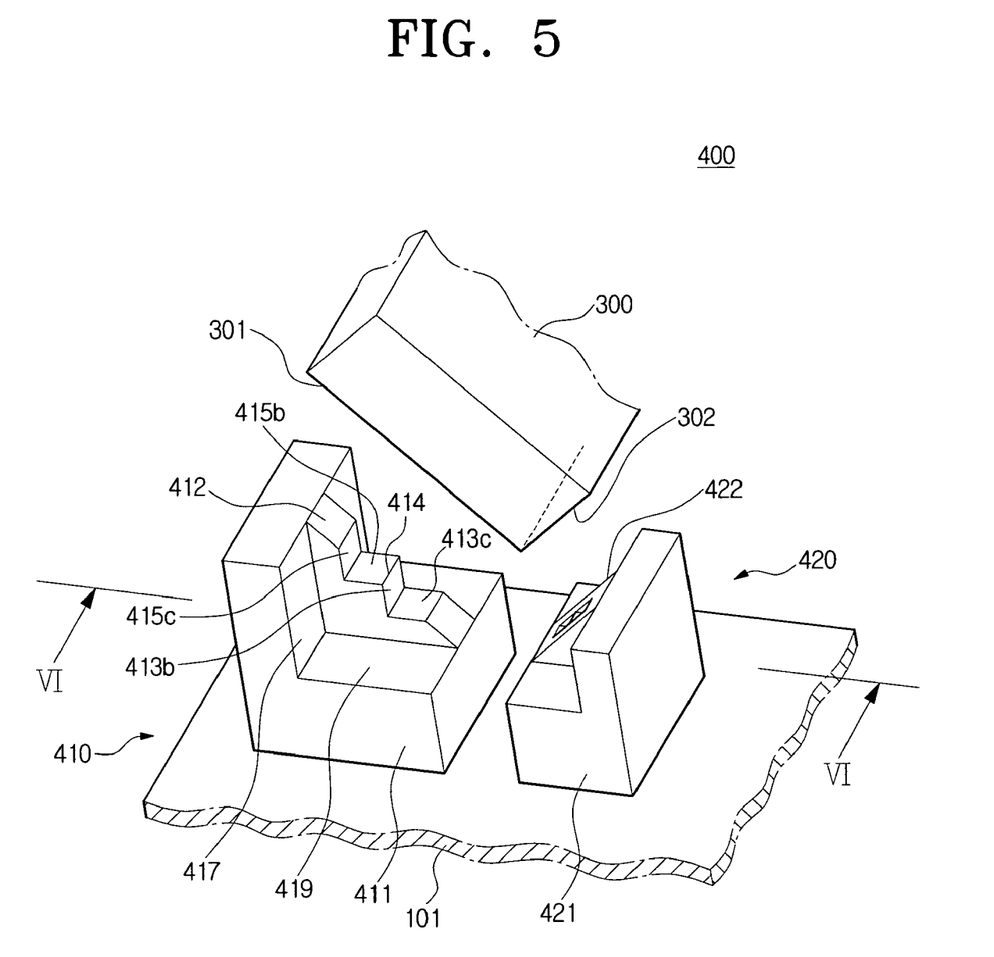
FIG. 5 is a perspective view exemplifying an optical component supporting apparatus in accordance with a third exemplary embodiment of the present invention.

FIG. 5 is a perspective view exemplifying an optical component supporting apparatus in accordance with a third exemplary embodiment of the present invention. As shown in FIG. 5, the optical component supporting apparatus of the third exemplary embodiment is substantially similar to the optical component supporting apparatus of the first exemplary embodiment shown in FIG. 3, except that a first vertical reference surface 413b and a first horizontal reference surface 415b are extended in an entire width of a supporting surface 412.

Figure 6:
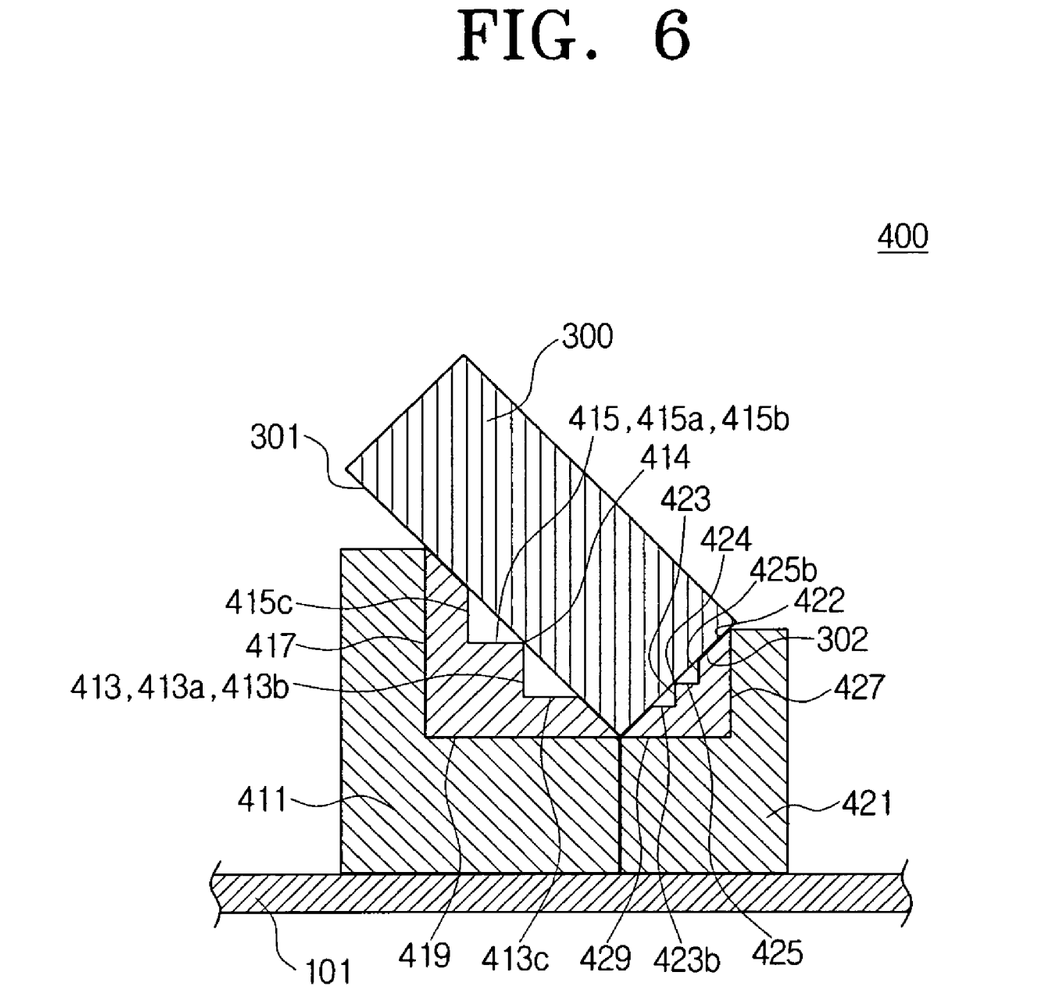
FIG. 6 is an elevational view in cross section taken along the line VI-VI of FIGS. 3, 4 and 5.

FIG. 6 is an elevational view in cross section taken along line VI-VI of FIGS. 3, 4 and 5.

Figure 7:
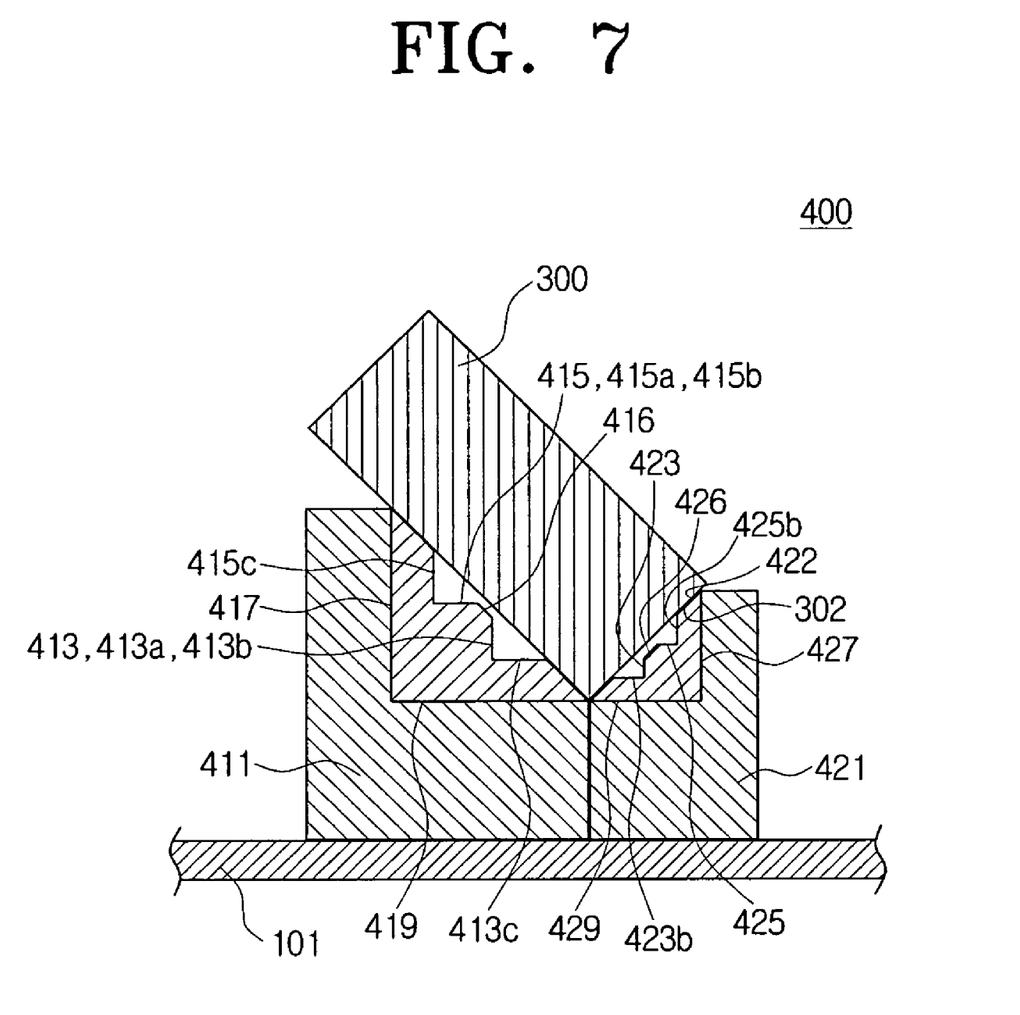
FIG. 7 is an elevational view in cross section exemplifying an optical component supporting apparatus in accordance with a fourth exemplary embodiment of the present invention.

FIG. 7 is an elevational view in cross section exemplifying an optical component supporting apparatus in accordance with a fourth exemplary embodiment of the present invention.

In the optical component supporting apparatus of the fourth exemplary embodiment, a chamfered part 416 is provided at a place in which the first vertical reference surface 413, 413a, or 413b and the first horizontal reference surface 415, 415a, or 415b intersect, so that it substantially prevents the edge part 414 from projecting beyond the supporting surface 412.

The chamfered part 416 may substantially prevent the edge part 414 from projecting beyond the supporting surface 412 due to a dimensional instability of the first vertical reference surface 413, 413a, or 413b and the first horizontal reference surface 415, 415a, or 415b, such that the optical component 300 may not be stably supported.

Figure 8:
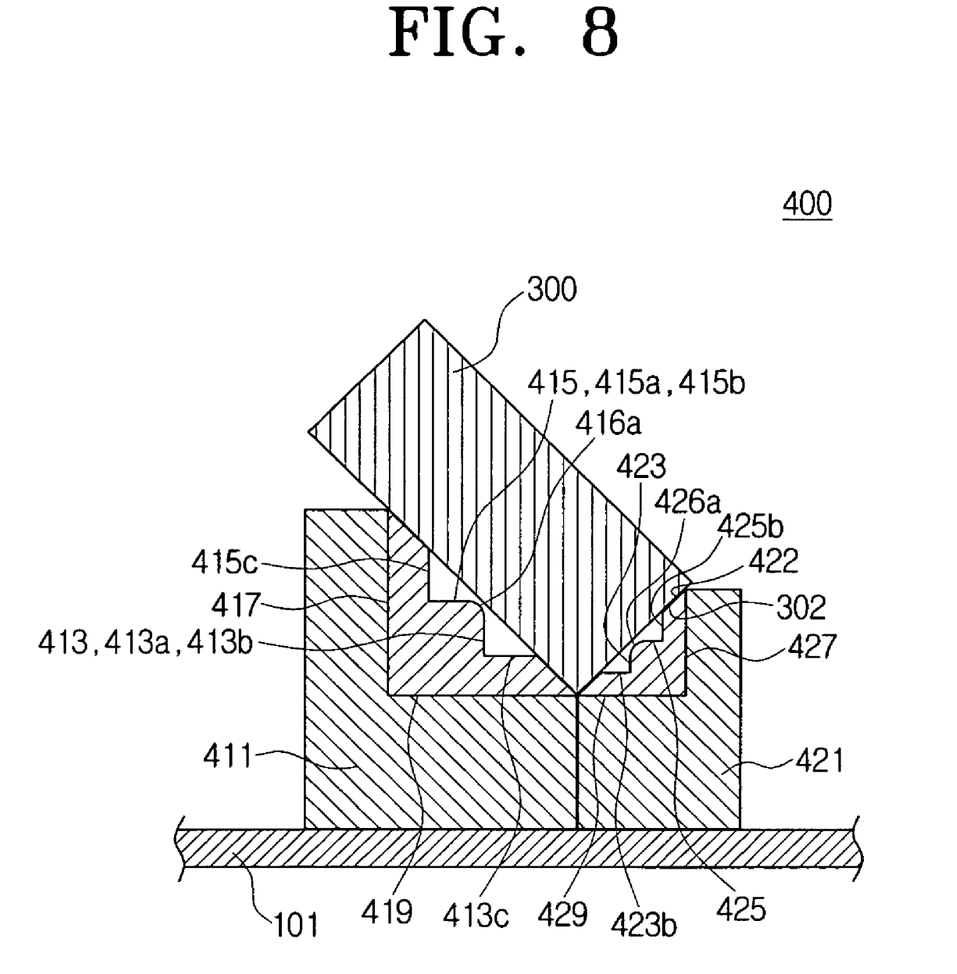
FIG. 8 is an elevational view in cross section exemplifying an optical component supporting apparatus in accordance with a fifth exemplary embodiment of the present invention.

As shown in FIG. 8, instead of the chamfered part 416, a rounded part 416 may be provided at the place in which the first vertical reference surface 413, 413a, or 413b and the first horizontal reference surface 415, 415a, or 415b intersect.

Both the chamfered part 416 and the rounded part 416 described above may be set as a reference area to or through which the light beam emitted from the light source unit 110 is reflected or permeated.

The optical component supporting apparatus 400 in accordance with the exemplary embodiments of the present invention may further include a subsidiary supporting unit 420, which supports a second surface 302 of the optical component 300 together with the main supporting unit 410 supporting the first surface 301 of the optical component 300.

The subsidiary supporting unit 420 includes a body 421, a supporting surface 422, a first vertical reference surface 423 and a first horizontal reference surface 425, and a second vertical reference surface 427 and a second horizontal reference surface 429. The supporting surface 422 is inclinedly provided in the body 421. The first vertical reference surface 423 and the first horizontal reference surface 425 are provided in the supporting surface 422. The second vertical reference surface 427 and the second horizontal reference surface 429 are provided in the body 421, and facilitate measuring an inclined angle of the supporting surface 422. Because constructions of the subsidiary supporting unit 420 are similar to those of the main supporting unit 410 of the exemplary embodiments described above, descriptions thereof will be omitted for clarity and conciseness.

A subsidiary horizontal surface 423b is disposed on a lower or left end of the first vertical reference surface 423, and a subsidiary vertical surface 425b is disposed on an upper or right end of the first horizontal reference surface 425.

An edge part 424 is formed at a place in which the first vertical reference surface 423 and the first horizontal reference surface 425 intersect, as shown in FIG. 6. A chamfered part 426 is provided at a place in which the first vertical reference surface 423 and the first horizontal reference surface 425 intersect, so that it substantially prevents the edge part 424 from projecting beyond the supporting surface 412, as shown in FIG. 7. Alternatively, a rounded part 426 may be provided at the place in which the first vertical reference surface 423 and the first horizontal reference surface 425 intersect.

The optical component 300 supported by the optical component supporting apparatus 400 in accordance with the exemplary embodiments of the present invention may be securely fixed to the optical frame 101 by a fastening means or a pressing means, which is not shown.

As apparent from the foregoing description, according to the exemplary embodiments of the present invention, the optical component supporting apparatus may install the optical component for reflecting or permeating the beam emitted from the light source in the accurate position and with the accurate orientation. Also, the optical component supporting apparatus according to the exemplary embodiments of the present invention facilitates the dimensional measurement of the supporting units on which the optical component is stably supported and installed.

Although a few exemplary embodiments of the present general invention have been shown and described, it will be appreciated by those skilled in the art that changes may be made in these exemplary embodiments without departing from the principles and spirit of the invention, the scope of which is defined in the appended claims and their equivalents.

What is claimed is:

1. An apparatus for supporting an optical component, comprising:
   a supporting surface to support the optical component;
   at least one horizontal reference surface;
   at least one vertical reference surface; and an inclined surface at an angle with respect to the at least one horizontal and vertical reference surfaces;

wherein the supporting surface comprises the inclined surface, the at least one horizontal reference surface and the at least one vertical reference surface.

2. The apparatus as claimed in claim 1, further comprising an edge part disposed at an intersection of the horizontal reference surface and the vertical reference surface.

3. The apparatus as claimed in claim 1, further comprising a chamfered part disposed at an intersection of the horizontal reference surface and the vertical reference surface.

4. The apparatus as claimed in claim 1, further comprising a rounded part disposed at an intersection of the horizontal reference surface and the vertical reference surface.

5. The apparatus as claimed in claim 1, wherein
the optical component comprises a reflective mirror, and
at least one of the horizontal reference surface and the vertical reference surface comprises at least one reference surface for measuring a reflective point of the reflective mirror.

6. An apparatus for supporting an optical component, comprising:
a body;
the body comprising a supporting surface inclined at an angle to the body;
a first horizontal reference surface; and
a first vertical reference surface;
wherein the supporting surface comprises the first vertical reference surface and the first horizontal reference surface.

7. The apparatus as claimed in claim 6, wherein the body further comprises a second horizontal reference surface and a second vertical reference surface for measuring an inclined angle of the supporting surface.

8. The apparatus as claimed in claim 6, further comprising an edge part disposed at an intersection of the first horizontal reference surface and the first vertical reference surface.

9. An apparatus for supporting an optical component, comprising:
a first supporting unit to support a first surface of the optical component; and
a second supporting unit to support a second surface of the optical component,
wherein at least one of the first and the second supporting units comprises:
a body;
the body comprising a supporting surface inclined at an angle to the body;
a first horizontal reference surface; and
a first vertical reference surface;
wherein the supporting surface comprises the first vertical reference surface and the first horizontal reference surface.

10. The apparatus as claimed in claim 9, wherein the body further comprises a second horizontal reference surface and a second vertical reference surface for measuring an inclined angle of the supporting surface.

11. The apparatus as claimed in claim 9, further comprising an edge part disposed at an intersection of the first horizontal reference surface and the first vertical reference surface.

12. A laser scanner, comprising:
a light source;
an optical component to reflect or permeate a beam emitted from the light source; and
a supporting unit to support the optical component, wherein the supporting unit comprises:
a body;
the body comprising a supporting surface inclined at an angle to the body;
a first horizontal reference surface; and
a first vertical reference surface;
wherein the supporting surface comprises the first vertical reference surface and the first horizontal reference surface.

13. The apparatus as claimed in claim 12, wherein the body further comprises a second horizontal reference surface and a second vertical reference surface for measuring an inclined angle of the supporting surface.

14. The apparatus as claimed in claim 12, further comprising an edge part disposed at an intersection of the first horizontal reference surface and the first vertical reference surface.

15. An image forming device, comprising:
a laser scanner to deflectively scan a beam for forming a latent image on a photoconductive medium,
wherein the laser scanner comprises:
a light source;
an optical component to reflect or permeate the beam emitted from the light source;
a supporting surface to support the optical component;
at least one horizontal reference surface;
at least one vertical reference surface; and
an inclined surface at an angle with respect to the at least one horizontal and vertical reference surfaces;
wherein the supporting surface comprises the inclined surface, the at least one horizontal reference surface and the at least one vertical reference surface.

16. The device as claimed in claim 15, further comprising an edge part disposed at an intersection of the horizontal reference surface and the vertical reference surface.

17. The device as claimed in claim 15, further comprising a chamfered part disposed at an intersection of the horizontal reference surface and the vertical reference surface.

18. The device as claimed in claim 15, further comprising a rounded part disposed at an intersection of the horizontal reference surface and the vertical reference surface.

19. The device as claimed in claim 15,
wherein the optical component comprises a reflective mirror, and
wherein at least one of the horizontal reference surface and the vertical reference surface comprises at least one reference surface for measuring a reflective point of the reflective mirror.

20. An apparatus for supporting an optical component, comprising:
a first supporting unit to support a first surface of the optical component;
a second supporting unit to support a second surface of the optical component;
a first supporting surface inclined at a first angle in the first supporting unit;
a second supporting surface inclined at a second angle in the second supporting unit; and
at least one horizontal reference surface and at least one vertical reference surface disposed in each of the first and second supporting surfaces.

21. The apparatus as claimed in claim 20, further comprising a first edge part disposed at an intersection of the horizontal reference surface and the vertical reference surface of the first supporting surface.

22. The apparatus as claimed in claim 21, further comprising a second edge part disposed at an intersection of the horizontal reference surface and the vertical reference surface of the second supporting surface.

23. The apparatus as claimed in claim 21, further comprising a first chamfered part disposed at an intersection of the horizontal reference surface and the vertical reference surface of the first supporting surface.

24. The apparatus as claimed in claim 23, further comprising a second chamfered part disposed at an intersection of the horizontal reference surface and the vertical reference surface of the second supporting surface.

25. The apparatus as claimed in claim 21, further comprising a first rounded part disposed at an intersection of the horizontal reference surface and the vertical reference surface of the first supporting surface.

26. The apparatus as claimed in claim 25, further comprising a second rounded part disposed at an intersection of the horizontal reference surface and the vertical reference surface of the second supporting surface.

27. The apparatus as claimed in claim 21, wherein
the optical component comprises a reflective mirror, and
the horizontal reference surface and the vertical reference surface of the first supporting surface comprise reference surfaces for measuring a reflective point of the reflective mirror.

28. The apparatus as claimed in claim 27, wherein
the horizontal reference surface and the vertical reference surface of the second supporting surface comprise reference surfaces for measuring a reflective point of the reflective mirror.

29. An apparatus for supporting an optical component, comprising:
a supporting surface to support the optical component;
at least one horizontal reference surface;
at least one vertical reference surface; and
a chamfered part disposed at an intersection of the horizontal reference surface and the vertical reference surface;
wherein the supporting surface comprises the at least one horizontal reference surface and the at least one vertical reference surface.

30. An apparatus for supporting an optical component, comprising:
a supporting surface to support the optical component;
at least one horizontal reference surface;
at least one vertical reference surface; and
a rounded part disposed at an intersection of the horizontal reference surface and the vertical reference surface;
wherein the supporting surface comprises the at least one horizontal reference surface and the at least one vertical reference surface.

31. An apparatus for supporting an optical component, comprising:
a supporting surface to support the optical component, the optical component comprising a reflective mirror;
at least one horizontal reference surface; and
at least one vertical reference surface;
wherein at least one of the horizontal reference surface and the vertical reference surface comprises at least one reference surface for measuring a reflective point of the reflective mirror; and
wherein the supporting surface comprises the at least one horizontal reference surface and the at least one vertical reference surface.

32. An image forming device, comprising:
a laser scanner to deflectively scan a beam for forming a latent image on a photoconductive medium,
wherein the laser scanner comprises:
a light source;
an optical component to reflect or permeate the beam emitted from the light source;
a supporting surface to support the optical component;
at least one horizontal reference surface;
at least one vertical reference surface; and
a chamfered part disposed at an intersection of the horizontal reference surface and the vertical reference surface;
wherein the supporting surface comprises the at least one horizontal reference surface and the at least one vertical reference surface.

33. An image forming device, comprising:
a laser scanner to deflectively scan a beam for forming a latent image on a photoconductive medium,
wherein the laser scanner comprises:
a light source;
an optical component to reflect or permeate the beam emitted from the light source;
a supporting surface to support the optical component;
at least one horizontal reference surface;
at least one vertical reference surface; and
a rounded part disposed at an intersection of the horizontal reference surface and the vertical reference surface;
wherein the supporting surface comprises the at least one horizontal reference surface and the at least one vertical reference surface.

34. An image forming device, comprising:
a laser scanner to deflectively scan a beam for forming a latent image on a photoconductive medium,
wherein the laser scanner comprises:
a light source;
an optical component to reflect or permeate the beam emitted from the light source, the optical component comprising a reflective mirror;
a supporting surface to support the optical component;
at least one horizontal reference surface; and
at least one vertical reference surface;
wherein at least one of the horizontal reference surface and the vertical reference surface comprises at least one reference surface for measuring a reflective point of the reflective mirror; and
wherein the supporting surface comprises the at least one horizontal reference surface and the at least one vertical reference surface.

* * * * *